United States Patent
Nozaki

(10) Patent No.: US 8,225,554 B2
(45) Date of Patent: Jul. 24, 2012

(54) DOOR OPENING TRIM WEATHER STRIP FOR MOTOR VEHICLE

(75) Inventor: Masahiro Nozaki, Aichi-ken (JP)

(73) Assignee: Toyoda Gosei Co. Ltd., Nishikasugai-gun, Aichi-ken (JP)

( * ) Notice: Subject to any disclaimer, the term of this patent is extended or adjusted under 35 U.S.C. 154(b) by 257 days.

(21) Appl. No.: 12/585,941

(22) Filed: Sep. 29, 2009

(65) Prior Publication Data
US 2010/0077672 A1  Apr. 1, 2010

(30) Foreign Application Priority Data

Sep. 30, 2008 (JP) ................... 2008-253790
Nov. 27, 2008 (JP) ................... 2008-302068
Jul. 16, 2009 (JP) ................... 2009-167571

(51) Int. Cl.
*E06B 7/22* (2006.01)
(52) U.S. Cl. .................... 49/498.1; 49/475.1
(58) Field of Classification Search ............... 49/498.1, 49/475.1
See application file for complete search history.

(56) References Cited

U.S. PATENT DOCUMENTS

| | | | | |
|---|---|---|---|---|
| 6,896,954 | B2 * | 5/2005 | Omori et al. | 428/304.4 |
| 7,326,471 | B2 * | 2/2008 | Shaw | 428/516 |
| 7,543,881 | B2 * | 6/2009 | Okajima et al. | 296/146.9 |
| 2001/0033927 | A1 * | 10/2001 | Omori et al. | 428/317.1 |
| 2005/0112301 | A1 * | 5/2005 | Omori et al. | 428/31 |
| 2006/0188678 | A1 * | 8/2006 | Ohlsson et al. | 428/35.7 |
| 2008/0110102 | A1 * | 5/2008 | Hotta et al. | 49/498.1 |
| 2008/0122251 | A1 * | 5/2008 | Okajima et al. | 296/146.9 |

FOREIGN PATENT DOCUMENTS

| | | |
|---|---|---|
| JP | 8-118956 | 5/1996 |
| JP | 9-2072 | 1/1997 |
| JP | 2007-283851 | 11/2007 |
| JP | 2008044572 A * | 2/2008 |
| JP | 2008-174196 | 7/2008 |
| JP | 2009126226 A * | 6/2009 |
| JP | 2009241337 A * | 10/2009 |
| JP | 2010-149838 A | 7/2010 |

OTHER PUBLICATIONS

Notice of IDS dated May 17, 2012.

* cited by examiner

*Primary Examiner* — Jerry Redman
(74) *Attorney, Agent, or Firm* — McGinn IP Law Group, PLLC

(57) ABSTRACT

A door opening trim weather strip for a motor vehicle, of which a tubular seal portion is difficult to be worn and exhibits good flexibility when passengers get and off the motor vehicle and contact the tubular seal portion. The door opening trim weather strip has a base portion for attachment to a flange provided in a door opening portion of a vehicle body, and a tubular seal portion integrally formed with the base portion for contacting the door, and sealing between the door and the door opening portion. The tubular seal portion adapted to extend along a rear vertical side of the door opening portion has a main body composed of a sponge material and a skin layer composed of a solid material and formed on a surface of the main body, and a first skin layer part of the skin layer has a thickness ranging from 0.3 mm to 0.5 mm.

5 Claims, 5 Drawing Sheets

DOOR OPENING TRIM WEATHER STRIP FOR MOTOR VEHICLE

CROSS-REFERENCE TO RELATED APPLICATION

This application is related to and claims priority from Japanese patent applications No. 2008-253790, 2008-302068 and 2009-167571 incorporated herein by reference.

BACKGROUND OF THE INVENTION

1. Field of the Invention

The present invention relates to a door opening trim weather strip for providing a seal between a door of a motor vehicle and a door opening portion of a vehicle body.

2. Description of Related Art

In order to provide a seal between a vehicle door and a door opening portion of a vehicle body, conventionally, a door weather strip is provided along an outer periphery of a door frame, a glass run is attached to a channel along an inner periphery of the door frame, etc., and a door opening trim weather strip is attached to a flange provided in the door opening portion.

As shown in FIG. 1. a door opening trim weather strip 10 is attached to a door opening portion 12 over an entire length thereof, and when a vehicle door is closed, the door opening trim weather strip 10 contacts a door frame 14 and/or an outer periphery of a door panel to seal between the door opening portion 12 and the vehicle door.

As shown in FIG. 2, a flange 16 is formed in the door opening portion 12 by bonding an inner panel 18 and an outer panel 20 to each other through welding.

The door opening trim weather strip 10 has a base portion (trim portion) 22 with a generally U-shaped cross-section, and the trim portion 22 is attached to the flange 16. A tubular seal portion 24 projecting outwardly from an outer side wall 26 of the trim portion 22 contacts a protruding part (not shown) of the door frame 14 and seals the same. A core member 28 such as a metal insert, etc. is embedded in the trim portion 22 for increasing its holding force against the flange 16, and an inner side wall 30, the outer side wall 26 and a bottom wall 32 define a generally U-shaped cross-section.

In order to hold the flange 16, outer holding lips 34 and an inner holding lip 36 are provided in the outer side wall 26 and the inner side wall 30 of the trim portion 22.

When the flange 16 is inserted into the trim portion 22, the outer holding lips 34 and the inner holding lip 36 flex to contact side faces of the flange 16 closely, thereby holding the flange 16. As a result, the door opening trim weather strip 10 can be attached to the flange 16.

As shown in FIG. 3, the door opening trim weather strip 10 is formed by extrusion into a single body. Then, the extruded body is connected via a joint 38 into a circular configuration, and is attached to the door opening portion 12.

As shown in FIG. 2, the tubular seal portion 24 protrudes outwardly from the outer side wall 26 of the trim portion 22 to contact a vehicle door when closed. Upon getting on or off a vehicle, passengers may contact the tubular seal portion 24 in their backs, hips, heads etc. so that a surface of the tubular seal portion 24 may be worn and consequently, the tubular seal portion 24 may be broken.

In order to overcome the above-described problems, as shown in FIG. 2, a film 38 made of a solid rubber has been provided in the tubular seal portion 24 over its protruding area (designated as reference character "X") (see Publications of Japanese unexamined patent applications Nos. 2008-174196, Hei 8-118956 and Hei 9-2072, for example.). In this case, by decreasing the thickness of the film 38, the door opening trim weather strip 10 can be made lightweight, but where the solid rubber film 38 is thin, it may be readily broken due to its wear while used over a long period of time. And when the film 38 is broken, air appears from a main body of the tubular seal portion 24.

On the other hand, where the thickness of the solid film 38 is increased, the weight thereof increases, and the rigidity of the tubular seal portion 24 is increased. Where the door opening trim weather strip 10 thus arranged is attached to a corner of the door opening portion 12, the tubular seal portion 24 does not favorably curve in conformity therewith. In addition, wrinkles may be generated in the tubular seal portion 24 on an inner peripheral side thereof. And the deflection load of the tubular seal portion 24 increases to enlarge a door closing force upon closing of the vehicle door.

As shown in FIG. 4, in another door opening trim weather strip 40 having a trim portion 42 and a tubular seal portion 44, a solid rubber film 46 is formed on an outer surface of the tubular seal portion 44, and a concave 48 defined with the trim portion 42 and the tubular seal portion 44 is filled with a solid rubber. With this arrangement, even if passengers contact the tubular seal portion 44 upon getting on or off the vehicle compartment, the tubular seal portion 44 is prevented from being pulled by them, and consequently, the tubular seal portion 44 is prevented from being broken (see Publication of Japanese unexamined patent application 2007-283851, for example.).

In still another door opening trim weather strip, a solid rubber film is partially formed in a tubular seal portion in a sectional direction thereof (see Publication of Japanese unexamined patent application No. Hei 11-301274, for example.).

However, in these cases, where the thickness of the solid rubber film of the tubular seal portion is decreased, the tubular seal portion is unfavorably broken, whereas where the thickness of the solid rubber film is increased, the door closing force upon closing of the vehicle door unfavorably increases, similarly to the preceding conventional door opening trim weather strip.

SUMMARY OF THE INVENTION

Accordingly, it is an object of the present invention to provide a door opening trim weather strip of which a tubular seal portion is difficult to be worn and effects flexibility when passengers contact the same upon getting on and off a vehicle compartment.

According to a first aspect of the present invention, a door opening trim weather strip for a motor vehicle for providing a seal between a door of a motor vehicle and a door opening portion of a vehicle body, has a base portion for attachment to a flange provided in the door opening portion, and a tubular seal portion integrally formed with the base portion for contacting the door, and sealing between the door and the door opening portion. The tubular seal portion extending along a rear vertical side of the door opening portion includes a main body composed of a sponge material, and a skin layer composed of a solid material and formed on a surface of the main body. A first skin layer part of the skin layer has a thickness ranging from 0.3 mm to 0.5 mm.

In the first aspect of the present invention, the door opening trim weather strip for a motor vehicle for providing a seal between a door of a motor vehicle and a door opening portion of a vehicle body, has a base portion for attachment to a flange provided in the door opening portion, and a tubular seal portion integrally formed with the base portion for contacting the door, and sealing between the door and the door opening portion. Therefore, when the base portion is attached to the flange, the tubular seal portion securely contacts the vehicle door, and can seal between the door opening portion and the vehicle door.

The tubular seal portion extending along the rear vertical side of the door opening portion includes a main body composed of a sponge material, and a skin layer composed of a solid material and formed on a surface of the main body. The first skin layer part of the skin layer has a thickness ranging from 0.3 mm to 0.5 mm. With this arrangement, the tubular seal portion effects good sealing properties without damaging the flexibility thereof, and the wear resistance of the first skin layer part of the skin layer can be improved. In addition, when passengers contact the tubular seal portion upon getting on and off a vehicle compartment, the skin layer exhibiting a sufficient wear resistance is not broken so that the appearance thereof is excellent.

The thickness of the first skin layer part of the skin layer of the tubular seal portion extending along a rear vertical side of the door opening portion is determined to the range from 0.3 mm to 0.5 mm. Therefore, the first skin layer part of the skin layer made of a solid material can be made thick in only the area that the passengers most readily contact the tubular seal portion upon getting on and off a vehicle compartment, thereby improving the wear resistance therein. As a result, the tubular seal portion can be made difficult to be broken in this area. The tubular seal portion extending along other parts than the rear vertical side of the door opening portion is not affected by the thick skin layer, and consequently the rigidity thereof is not increased. Therefore, the door closing force upon closing the vehicle door is not enlarged, the tubular seal portion can readily curve, conforming to corners in the door opening portion, and no wrinkle is generated in an inner periphery of the curved tubular seal portion of the door opening trim weather strip attached to the corners.

When the thickness of the first skin layer part of the skin layer is less than 0.3 mm, a sufficient wear resistance is not effected, and when the thickness exceeds 0.5 mm, the rigidity of the tubular seal portion increases due to the solid material, thereby enlarging the door closing force upon closing the vehicle door.

According to a second aspect of the present invention, the tubular seal portion extending along other parts than the rear vertical side of the door opening portion includes a second skin layer part of the skin layer having a thickness of not more than 0.2 mm.

In the second aspect of the present invention, by determining the thickness of the second skin layer part of the skin layer of the tubular seal portion extending along other parts than the rear vertical side of the door opening portion to not more than 0.2 mm, the rigidity of the tubular seal portion can be made low, similarly to the conventional arrangement. Therefore, in the area where the passengers may not contact the tubular seal portion upon getting on and off the vehicle compartment, the skin layer of a solid material can be made thin or omitted. Consequently, the door closing force upon closing the vehicle door is not enlarged, and the tubular seal portion can readily curve, conforming to corners in the door opening portion. In addition, no wrinkle is generated in an inner periphery of the curved tubular seal portion of the door opening trim weather strip attached to the corners.

According to a third aspect of the present invention, the first skin layer part of the skin layer is formed on at least a projecting top of the tubular seal portion, which has an arc-shaped cross-section.

In the third aspect of the present invention, the first skin layer part of the skin layer is formed on at least a projecting top of the tubular seal portion, which has an arc-shaped cross-section, so that the projecting top of the tubular seal portion, which is easy to contact the passengers upon getting on and off the vehicle compartment, can be covered with a comparatively thicker solid material, whereby the wear resistance can be improved therein. Where only the projecting top of the tubular seal portion, which has an arc-shaped cross-section, is covered with the solid material, the rigidity of the area other than the projecting top is not so increased, whereby the flexibility of the entire part of the tubular seal portion can be ensured.

According to a fourth aspect of the present invention, a thickness varying part composed of the same material as that of the first skin layer part of the skin layer that is formed at the projecting top of the tubular seal portion is formed on the surface of the main body of the tubular seal portion continuously with the first skin layer part of the skin layer such that as the distance from the first skin layer part of the skin layer increases, the thickness gradually decreases.

In the fourth aspect of the present invention, a thickness varying part is formed of the same material as that of the first skin layer part of the skin layer on the surface of the main body of the tubular seal portion continuously with the first skin layer part of the skin layer such that as the distance from the skin layer increases, the thickness gradually decreases. Therefore, by forming the thickness varying part continuously with the skin layer, the precise adjustment of the extruding amount of the solid material is not needed during extrusion, whereby the skin layer and the thickness varying part can be readily formed of the solid material.

In addition, no difference in level is generated between surfaces of the skin layer and the main body of the tubular seal portion so that the sealing properties can be improved therein.

According to a fifth aspect of the present invention, a cover lip adapted to cover a projecting end of an interior member mounted on a vehicle compartment is formed integrally with the base portion or the tubular seal portion.

In the fifth aspect of the present invention, a cover lip adapted to cover a projecting end of an interior member mounted on a vehicle compartment is formed integrally with the base portion or the tubular seal portion so that the projecting end of the interior member can be covered with the cover lip, whereas the flange of the door opening portion can be covered with the skin layer of the tubular seal portion and the cover lip, whereby the appearance can be improved.

The tubular seal portion of the door opening trim weather strip for attachment to a rear vertical side of the door opening portion, which the passengers most readily contact upon getting on and off the vehicle compartment, includes a main body composed of a sponge material, and a skin layer composed of a solid material. Since the first skin layer part of the skin layer is made as comparatively thick as 0.3 mm through 0.5 mm in this part, the wear resistance of the skin layer can be improved therein. And since the thickness of the second skin layer part of the skin layer in other parts than the rear vertical side of the door opening portion is determined to be not more than 0.2 mm, the door closing force is not enlarged, the tubular seal portion can curve in conformity with corners of the door opening portion, and no wrinkle is generated in the tubular seal portion attached to the corners.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 8:
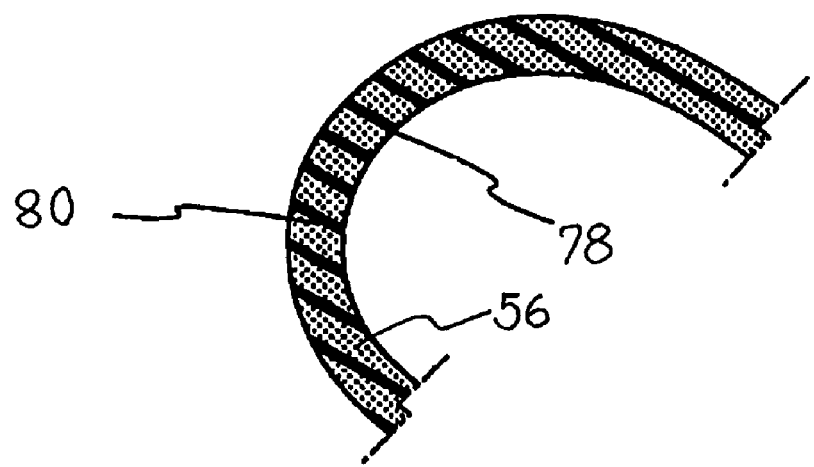
FIG. 8 is an enlarged sectional view of a first embodiment of a door opening trim weather strip in accordance with the present invention, showing a part of a tubular seal portion on which no skin layer is formed, for example, shown in section 5-5 of FIG. 1.
Figure 9:
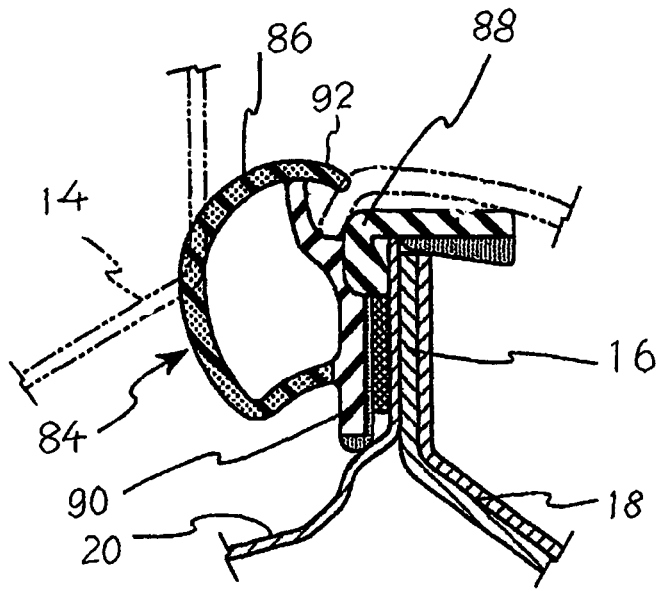
FIG. 9 is a sectional view of a second embodiment of a door opening trim weather strip in accordance with the present invention, for example, shown alternative to a same cross section as 5-5 of FIG. 1.
Figure 10:
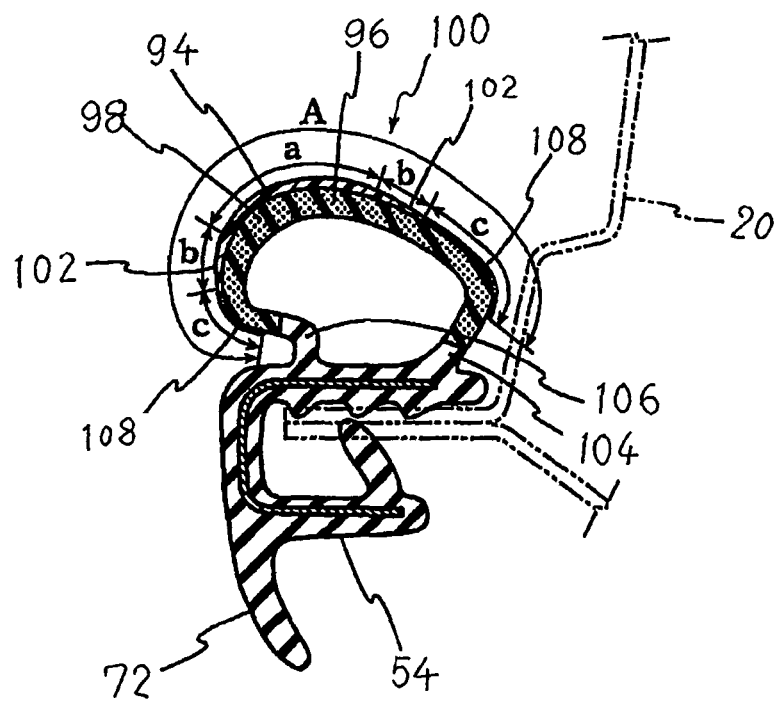
FIG. 10 is a sectional view of a third embodiment of a door opening trim weather strip in accordance with the present invention, for example, shown alternative to a same cross section as 5-5 of FIG. 1.

Hereinafter, embodiments of the present invention will be explained with reference to FIGS. 1, 3, 5 through 10. FIGS. 5 through 8 show a first embodiment of a door opening trim weather strip in accordance with the present invention. FIG. 9 shows a second embodiment of a door opening trim weather strip in accordance with the present invention. FIG. 10 shows a third embodiment of a door opening trim weather strip in accordance with the present invention. First, the first embodiment of the present invention will be explained, and then the second and third embodiments will be explained.

Figure 1:
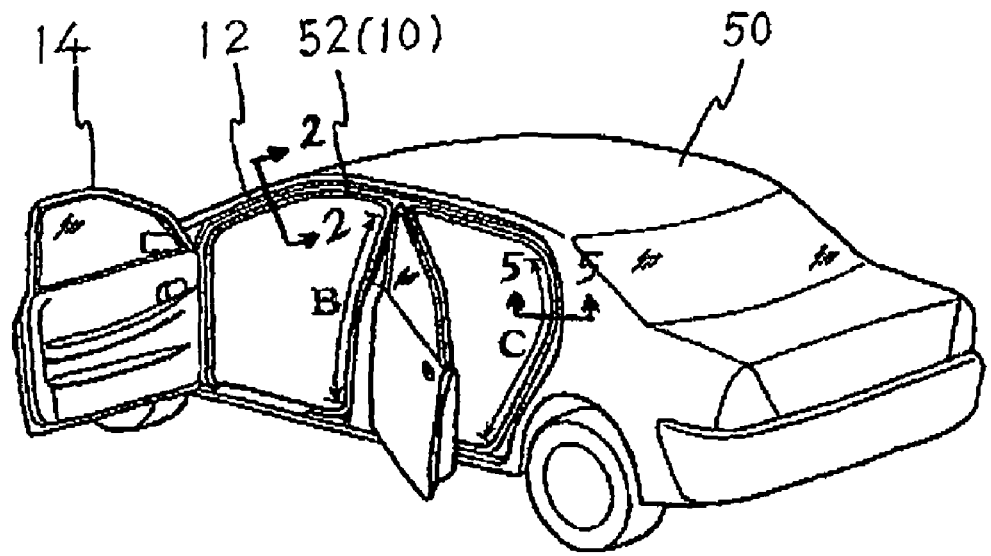
FIG. 1 is a perspective view of a motor vehicle in a state where a door is opened, which is seen from a rear side thereof.
Figure 2:
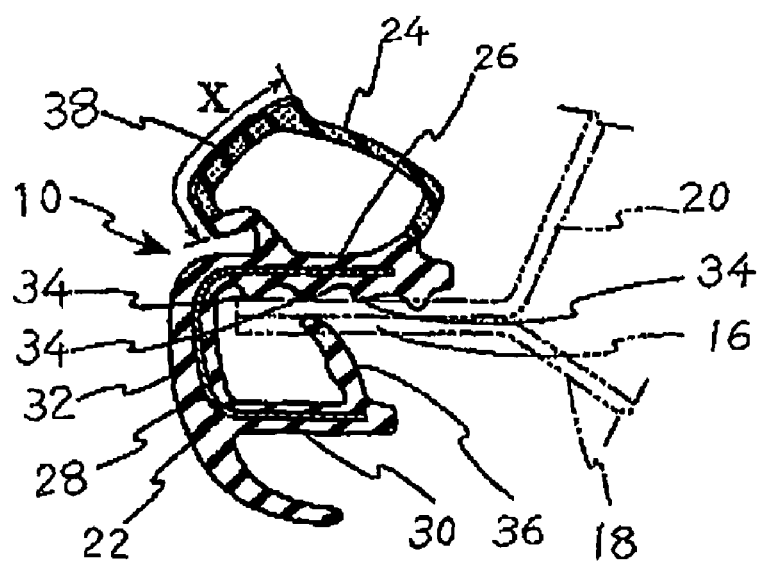
FIG. 2 is a sectional view of a conventional door opening trim weather strip in an attached state to a door opening portion of a motor vehicle, for example, shown in section 2-2 of FIG. 1.
Figure 5:
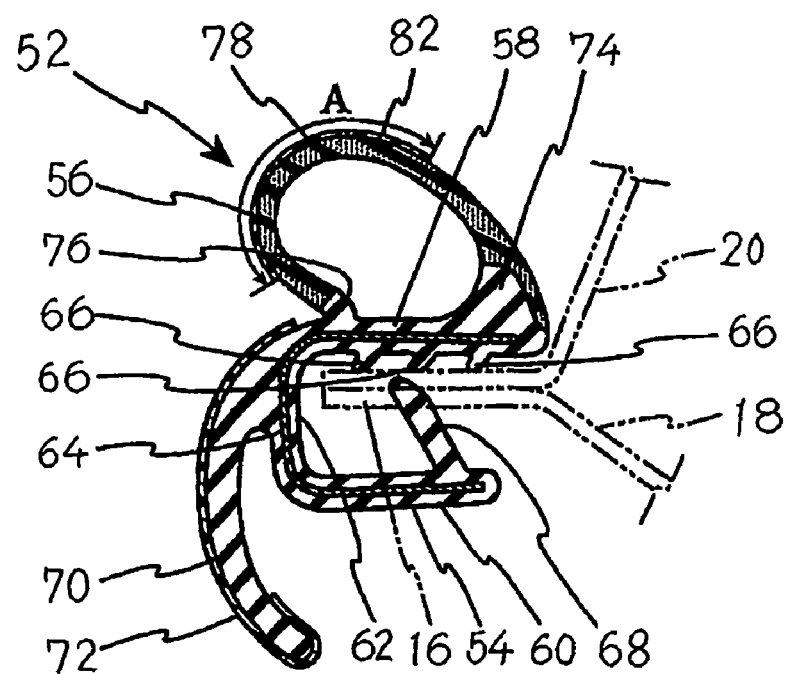
FIG. 5 is a sectional view of a first embodiment of a door opening trim weather strip in accordance with the present invention, for example, shown in section 5-5 of FIG. 1.

As shown in FIG. 1, a body 50 of a motor vehicle has a door opening, and the door opening is closed and opened with a vehicle door. The door opening is defined with a door opening portion 12, and as shown in FIG. 5, a flange 16 is provided along the door opening portion 12 by welding the inner panel 18 and the outer panel 20 composing the body 50 together. The number of panels welded together for providing the flange 16 varies from two panels to eight panels according to the position in the door opening portion 12.

A door opening trim weather strip 52 is attached to the flange 16 to provide a seal between the door opening portion 12 and the vehicle door. The door opening trim weather strip 52 is attached along the door opening portion 12 on the front side and the rear side of the vehicle body. The present embodiment will be explained with reference to the door opening trim weather strip 52 for attachment on the front side of the vehicle body. The door opening trim weather strip for attachment on the rear side of the vehicle body is attached, similarly.

Figure 3:
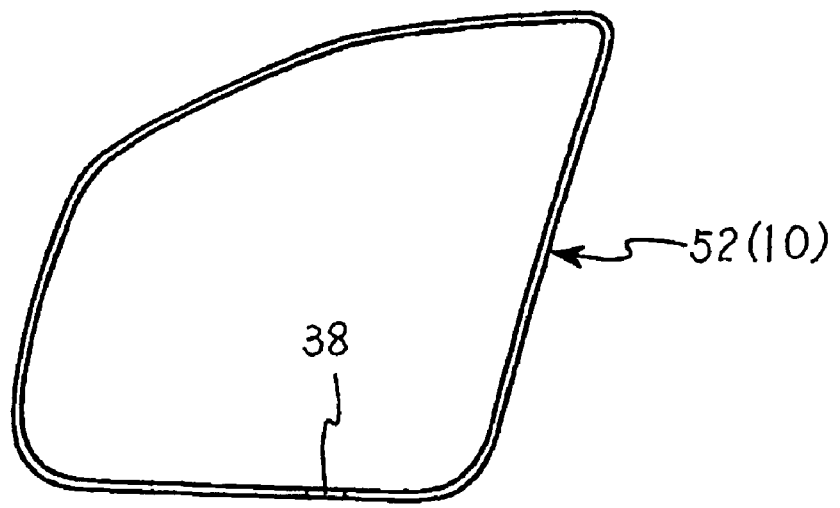
FIG. 3 is a front view of a door opening trim weather strip.
Figure 4:
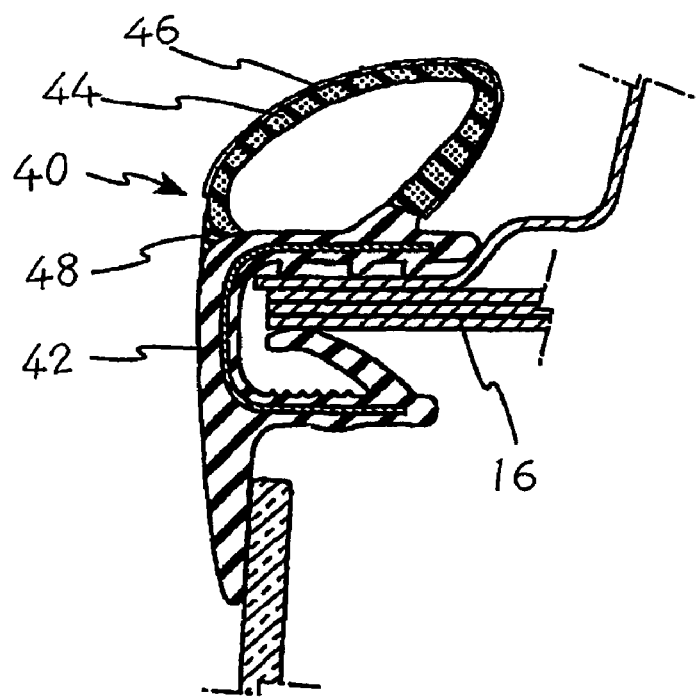
FIG. 4 is a sectional view of a conventional door opening trim weather strip in an attached state to a door opening portion of a motor vehicle.

The door opening trim weather strip 52 is formed straight by extrusion. As shown in FIG. 3, this straight door opening trim weather strip 52 is connected via the joint 38 into a ring-shaped configuration, and attached to the door opening portion 12. Upon attaching of the door opening trim weather strip 52, it is attached to the flange 16 from its one end to its other end sequentially. And when attaching is completed, the other end of the door opening trim weather strip 52 is connected to the one end thereof. These ends of the door opening trim weather strip 52 may be connected into a ring-shaped configuration with the joint 38 by molding. Since the door opening trim weather strip 52 formed straight is attached to corners in the door opening portion 12, the door opening trim weather strip 52 may be bent at the corners in the door opening portion 12, and consequently, may be readily wrinkled.

Alternatively, the ends of the door opening trim weather strip 52 may be bonded with adhesive before attaching thereof, and then may be curved into a ring-shaped configuration.

Next, the cross-sectional shape of the door opening trim weather strip 52 in the first embodiment of the present invention will be explained with reference to FIGS. 5 through 8.

As shown in FIG. 5, the door opening trim weather strip 52 has a trim portion (base portion) 54 with a generally U-shaped cross section, which is adapted to be attached to the flange 16, and a tubular seal portion 56 formed integrally with the trim portion 54 so as to protrude outwardly of the trim portion 54 to contact a protruding part (not shown) of the door frame 14, thereby providing a seal between the vehicle door and the door opening portion. The tubular seal portion 56 will be explained later.

The trim portion 54 has an outer side wall 58, an inner side wall 60 and a bottom wall 62 to define a generally U-shaped cross-section. An insert member 64 is embedded in the trim portion 54 for increasing its holding strength against the flange 16. The insert member 64 is made of a metallic plate or a hard resin, and in order to ensure the flexibility of the trim portion 54 upon attaching of the same to corners, it is configured like a ladder, a fish bone, a zigzag, a bone fragment, etc. The trim portion 54 is composed of a solid material, a finely foamed material or a sponge material.

Outer holding lips 66 and an inner holding lip 68 adapted to hold the flange 16 are provided in the outer side wall 58 and the inner side wall 60 of the trim portion 54 so as to extend in a longitudinal direction thereof, respectively. When the flange 16 is inserted into the trim portion 54, tip ends of the outer holding lips 66 and the inner holding lip 68 contact both side faces of the flange 16 to securely hold the flange 16. Consequently, the trim portion 54 is prevented from being deflected downwardly, and the tubular seal portion 56 securely contacts the door frame 14, etc., thereby ensuring the sealing properties.

In the present embodiment, three short outer holding lips 66 and a single long inner holding lip 68 project obliquely in an interior of the U-shaped trim portion 60, respectively. Consequently, the flange 16 is positioned on the inner side of the outer side wall 58, and is stably held with the three outer holding lips 66. The inner holding lip 68 presses the flange 16 against the outer side wall 58, thereby stably holding the flange 16. And, the outer and inner holding lips 66 and 68 securely flex in conformity with irregularities and deflections of the flange 16, and continuously contact the flange 16 to effect good sealing properties.

A cover lip 70 extends from an outer surface of the bottom wall 62 of the trim portion 54. The cover lip 70 can cover projecting ends of interior members mounted in a vehicle compartment as well as gaps between the interior members and the door opening trim weather strip 52. The cover lip 70 may be provided on the side of the tubular seal portion 56, as shown in FIG. 9. In this case, the flange 16 is covered with the bottom wall 62 of the trim portion 54, whereas projecting ends of interior members positioned on the upper side of the trim portion 54 can be covered with this cover lip 70, thereby improving the appearance therearound. The cover lip 70 may be formed of a solid material, similarly to the trim portion 54, or may be formed of a sponge material, similarly to the tubular seal portion 56. Where the cover lip 70 is provided to extend from the trim portion 54, a decorative sheet 72 may be provided on an outer surface of the cover lip 70 in the position facing the interior members.

The tubular seal portion 56 with an arc-shaped cross-section is formed outside the outer side wall 58 integrally therewith. The tubular seal portion 56 has a first side seal wall 74, a second side seal wall 76 and a contacting seal wall 78. The first side seal wall 74 and the second side seal wall 76 are formed of a solid material integrally with the trim portion 54 so as to project outwardly, whereas the contacting seal wall 78 is formed of a sponge material so as to project outwardly with an arc-shaped cross-section, and connect tip ends of the first side seal wall 74 and the second side seal wall 76.

When the vehicle door is closed, the contacting seal wall 78 contacts the door frame 14 and the door panel to provide a seal between the door opening portion 12 and the vehicle door. Since the first side seal wall 74 and the second side seal wall 76 are made of a solid material, the tubular seal portion 56 can be prevented from being deformed abnormally, thereby ensuring good sealing properties when contacting the outer periphery of the door. And where the door opening trim weather strip 52 is curved in conformity with corners in the door opening portion 12, the tubular seal portion 56 can be prevented from being crushed.

Figure 6:
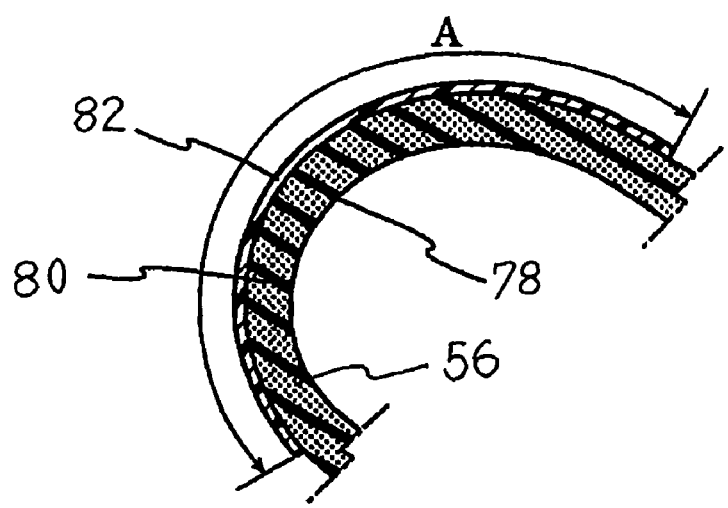
FIG. 6 is an enlarged sectional view of a first embodiment of a door opening trim weather strip in accordance with the present invention, showing a part of a tubular seal portion on which a thick skin layer is formed, for example, shown in section 5-5 of FIG. 1.

As shown in FIG. 6, the contacting seal wall 78 of the tubular seal portion 56 that extends along a rear vertical side of the door opening portion 12 has a main body 80 made of a sponge material, and a skin layer 82 made of a solid material on an outer surface of the main body 80.

Figure 7:
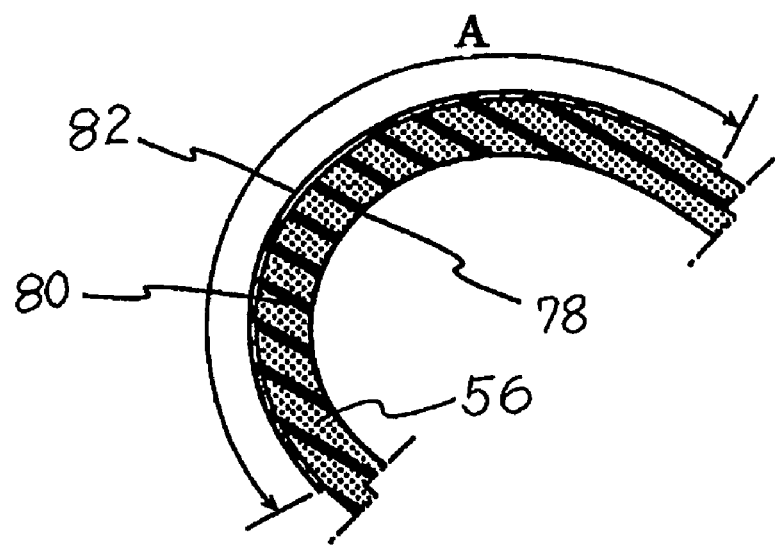
FIG. 7 is an enlarged sectional view of a first embodiment of a door opening trim weather strip in accordance with the present invention, showing a part of a tubular seal portion on which a thin skin layer is formed, for example, shown in section 5-5 of FIG. 1.

And, as shown in FIG. 7, the contacting seal wall 78 of the tubular seal portion 56 that extends along other parts than the rear vertical side of the door opening portion 12 has a main body 80 made of a sponge material, and a skin layer 82 made of a solid material with a thickness less than that of the tubular seal portion 56 that extends along the rear vertical side of the door opening portion 12 on an outer surface of the main body 80 Therefore, the outer surface of the tubular seal portion 56 of the door opening trim weather strip 52 can be covered with a smooth solid layer over an entire length thereof, thereby improving the outer appearance thereof. In addition, by making the first skin layer part of the skin layer 82 along the rear vertical side of the door opening portion 12 thicker than that along other parts than the rear vertical side of the door opening portion 12, the wear resistance can be improved in the tubular seal portion 56 extending along the rear vertical side of the door opening portion 12.

The thickness of the first skin layer part of the skin layer 82 of the tubular seal portion 56 along the rear vertical side of the door opening portion 12 is 0.4 mm, which is greater than 0.2 mm as the thickness of the second skin layer part of the skin layer 82 along other parts than the rear vertical side of the door opening portion 12. In FIG. 1, the rear vertical side of the door opening portion 12 on a front side of a vehicle body is designated as reference character "B", and that on a rear side thereof is designated as reference character "C". The skin layers along the rear vertical sides "B" and "C" respectively have a thickness of 0.4 mm. The thickness of these thicker skin layers can be determined to 0.3 mm through 0.5 mm.

When passengers get on and off the motor vehicle, their torsos inclusive of their backs and hips, and their heads may contact the tubular seal portion 56 in the parts designated as "B" and "C" of the door opening portion 12.

By determining the thickness of the skin layer 82 in these parts of "B" and "C" to 0.4 mm, the tubular seal portion 56 can be covered with a thicker solid material in the parts that may contact the passengers upon getting on and off the motor vehicle so that the wear resistance of the tubular seal portion 56 can be improved.

As described above, the thickness of the first skin layer part of the skin layer 82 can be determined to 0.3 mm through 0.5 mm and consequently where the passengers contact the tubular seal portion 56 upon getting on and off the motor vehicle, the thicker skin layer 82 exhibits a sufficient wear resistance to prevent the breaking thereof, thereby keeping good appearance. When the thickness of the thicker skin layer 82 is less than 0.3 mm, a sufficient wear resistance cannot be effected over a long period of time, whereas when the thickness of the thicker skin layer 82 exceeds 0.5 mm, the rigidity of the tubular seal portion 56 increases to enlarge the door opening force.

As shown in FIG. 5, the thicker skin layer 82 is formed on at least a projecting top of the contacting seal wall 78 of the tubular seal portion 56 (that is an area designated as "A"), which has an arc-shaped cross-section. Therefore, the area of the tubular seal portion 56, in which the passengers may contact the tubular seal portion 56 upon getting on and off the motor vehicle, can be covered with the thick solid material so as to exhibit improved wear resistance therein.

The thickness of the second skin layer part of the skin layer 82 in other parts than the rear vertical side of the door opening portion 16 is as small as 0.2 mm so as not to increase the rigidity of the entire length of the tubular seal portion 56. Consequently, the door closing force is not enlarged, and the tubular seal portion 56 can readily curve in conformity with corners in the door opening portion 16 so that wrinkles are prevented from being formed in a curved tubular seal portion 56.

The thickness of the second skin layer part of the skin layer 82 in other parts than the rear vertical side of the door opening portion 16 is determined to 0 through 0.2 mm. FIG. 7 is an enlarged sectional view of the tubular seal portion 56 where the second skin layer part of the skin layer 82 has a thickness of 0.2 mm, and FIG. 8 is an enlarged sectional view of the tubular seal portion 56 where the skin layer has a thickness of 0 mm, namely, no solid material exsits.

When the thickness of the second skin layer part of the skin layer 82 in other parts than the rear vertical side of the door opening portion 16, which passengers may not contact upon getting on and off the motor vehicle, is determined to 0.2 mm, as shown in FIG. 7, the rigidity of the entire length of the tubular seal portion 56 is not increased, and consequently, the door closing force is not enlarged. In addition, the tubular seal portion 56 can readily curve in conformity with corners in the door opening portion 16 so that wrinkles are prevented from being generated in a curved tubular seal portion 56. As shown in FIG. 8, the second skin layer part of the skin layer 82 can be omitted from other parts than the rear vertical side of the door opening portion 16, but where the skin layer 82 with a thickness of 0.1 mm through 0.2 mm can improve the appearance over the entire length of the tubular seal portion 56, and exhibit excellent sound isolation properties.

The tubular seal portion 56 of the door opening trim weather strip 52 is composed of a sponge material of an EPDM rubber or a thermoplastic olefin elastomer, whereas the trim portion 54 is composed of a solid material or a finely foamed material of an EPDM rubber or a thermoplastic olefin elastomer. With this arrangement, products with good weather resistance can be obtained. In addition, in this case, the door opening trim weather strip 52 is entirely composed of olefin materials so that they can be recycled after pulverized together.

Next, a second embodiment of the present invention will be explained.

In the first embodiment, the insert member 64 is embedded in the trim portion 54. In the second embodiment, as shown in FIG. 9, a door opening trim weather strip 84 has a tubular seal portion 86 and a trim portion 88, but no insert member is embedded in the trim portion 88. An outer side wall 90 of the trim portion 88 is attached to the flange 16 using a double-sided adhesive tape. In the second embodiment, a cover lip 92 is provided on the side of the tubular seal portion 86, as is different from the first embodiment. The remaining structure of the tubular seal portion 86 and the thickness of the skin layer thereof in the second embodiment are the same as those of the first embodiment.

Next, a third embodiment of the present invention will be explained with reference to FIG. 10.

The third embodiment differs from the first embodiment in regard to the configuration of an outer surface of the tubular seal portion so that different structures will be explained and explanations of similar structures will be omitted.

In the third embodiment, a skin layer 94 is formed on a main body 96 of a tubular seal portion 98 of a door opening trim weather strip 100, similarly to the first embodiment, but thickness varying parts 102 are formed on an outer surface of the main body 96 continuously with the skin layer 94, as is different from the first embodiment.

The thickness varying parts 102 are formed of a solid material that is the same as that of the skin layer 94, and formed at both ends of the skin layer 94 so as to respectively extend in directions of a first side seal wall 104 and a second side seal wall 106 of the tubular seal portion 98. And thin-walled parts 108 are formed of a solid material that is the same as that of the skin layer 94 so as to be continuous with both extending ends of the thickness varying parts 102, respectively.

In FIG. 10, the area where the skin layer 94 is formed is designated as "a", the areas where the thickness varying parts 102 are formed are designated as "b", and the areas where the thin-walled parts 108 are formed are designated as "c". And the entire area covered with the solid material is designated as "A". Thus, an outer surface of the main body 96 of the tubular seal portion 98, which is seen from the outside of the vehicle body, can be covered with the solid material. The thin-walled parts 108 may be omitted.

Each of the thickness varying parts 102 has such an arrangement that its thickness gradually decreases from a joint with the skin layer 94 towards a joint with the thin-walled part 108. For example, the first skin layer part of the skin layer 94 has a thickness of 0.4 mm, the second skin layer part of the thin-walled part 108 has a thickness of 0.2 mm, and the thickness varying part 102 has a thickness decreasing from 0.4 mm to 0.2 mm.

Therefore, by continuously forming the skin layer 94, the thickness varying parts 102 and the thin-walled parts 108 (no thin-walled part may be formed), the extruding amount of the solid material need not be precisely adjusted during extrusion, thereby facilitating the formation of the skin layer 94, the thickness varying parts 102 and the thin-walled parts 108, each being formed of a solid material.

In addition, no difference in level is generated between surfaces of the skin layer 94 and the main body 96 of the tubular seal portion 98, thereby enabling the improvement of the sealing properties.

Hereinafter, the producing method of the door opening trim weather strip in accordance with the present invention will be explained.

The door opening trim weather strips 52, 84 and 100 of the present invention is formed by extrusion, and a solid rubber composing the trim portions 54 and 88, and a sponge rubber composing the insert member 64 and the tubular seal portions 56, 86 and 98 can be integrally extruded with an extruder.

The thickness of the skin layers 82 and 94 is varied by varying the dimensions of an opening of a slide die of the extruder adapted to extrude the solid rubber, thereby forming a predetermined area of the skin layer thick, and forming the thickness varying parts and the thin-walled parts.

Then, vulcanization is carried out by a normal vulcanization method, and a vulcanized material is cut to a predetermined length in a state its configuration is stable. As a result, the door opening trim weather strip is obtained.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A door opening trim weather strip for a motor vehicle for providing a seal between a door of a motor vehicle and a door opening portion of a vehicle body, the door opening trim comprising:

a base portion for attachment to a flange provided in the door opening portion; and a tubular seal portion integrally formed with said base portion for contacting the door, and sealing between the door and the door opening portion, wherein said tubular seal portion extends along at least a rear vertical side of the door opening portion and includes a main body comprising a sponge material, a skin layer that comprises a first skin layer part, said skin layer comprising a solid material and being formed on a surface of said main body, the first skin layer part having a thickness ranging from 0.3 mm to 0.5 mm, wherein said tubular seal portion further extends along parts other than said rear vertical side of the door opening portion, in said parts other than said rear vertical side, said skin layer comprising a second skin layer part having a thickness of not more than 0.2 mm, and wherein said first skin layer part is formed on at least a projecting top of said tubular seal portion, at least a portion of said tubular seal portion, adjacent to both attachments areas between the base portion and the tubular seal portion, being free of the first skin layer part.

2. The door opening trim weather strip for the motor vehicle as claimed in claim 1, further comprising a thickness varying part which comprises the same material as that of said first skin layer part of said skin layer on said surface of said main body of said tubular seal portion continuously with said second skin layer part of said skin layer such that as a distance increases thereof, a thickness of the thickness varying part gradually decreases.

3. The door opening trim weather strip for the motor vehicle as claimed in claim 1, further comprising a cover lip adapted to cover a projecting end of an interior member mounted on a vehicle compartment, which is formed integrally with one of said base portion and said tubular seal portion.

4. The door opening trim weather strip for the motor vehicle as claimed in claim 1, wherein a portion, of the surface of said main body is exposed.

5. The door opening trim weather strip for the motor vehicle as claimed in claim 1, wherein a portion of the surface of said main body is devoid of the skin layer.

* * * * *